United States Patent

Harvey et al.

(10) Patent No.: US 10,515,258 B2
(45) Date of Patent: Dec. 24, 2019

(54) METHODS, APPARATUS, COMPUTER PROGRAMS, AND NON-TRANSITORY COMPUTER READABLE STORAGE MEDIUMS FOR PROCESSING DATA FROM A SENSOR

(71) Applicant: ROLLS-ROYCE plc, London (GB)

(72) Inventors: Giles E. Harvey, Derby (GB); Adriano Pulisciano, Birmingham (GB)

(73) Assignee: ROLLS-ROYCE PLC, London (GB)

( * ) Notice: Subject to any disclaimer, the term of this patent is extended or adjusted under 35 U.S.C. 154(b) by 159 days.

(21) Appl. No.: 15/673,905

(22) Filed: Aug. 10, 2017

(65) Prior Publication Data

US 2018/0060646 A1 Mar. 1, 2018

(30) Foreign Application Priority Data

Aug. 25, 2016 (GB) .................................. 1614492.5

(51) Int. Cl.
*G06K 9/00* (2006.01)
*G06T 7/33* (2017.01)

(52) U.S. Cl.
CPC ............ *G06K 9/00214* (2013.01); *G06T 7/33* (2017.01); *G06T 2200/04* (2013.01)

(58) Field of Classification Search
CPC ............. G06K 9/00214; G06K 9/6201; G06K 9/3233; G06K 9/2063; G06K 9/183; G06K 9/00201; G06K 9/2027; G06K 2209/19; G06T 7/33; G06T 17/30; G06T 2200/04

See application file for complete search history.

(56) References Cited

U.S. PATENT DOCUMENTS

| 7,426,292 B2 | 9/2008 | Moghaddam et al. |
| 7,447,598 B2 | 11/2008 | Malkin et al. |
| 8,442,665 B2 | 5/2013 | Krause |
| 8,848,201 B1* | 9/2014 | Bruce .................. G01B 21/047 356/601 |
| 9,033,797 B1* | 5/2015 | Karpiuk .................. A63F 13/08 463/31 |
| 9,129,355 B1* | 9/2015 | Harvey ................. G06T 7/0008 |
| 9,424,461 B1* | 8/2016 | Yuan .................. G06K 9/00201 |

(Continued)

FOREIGN PATENT DOCUMENTS

| GB | 2516321 | 1/2015 |
| JP | 2006329632 | 12/2006 |

OTHER PUBLICATIONS

Min-Koo Kim, et al., "A framework for dimensional and surface quality assessment of precast concrete elements using BIM and 3D laser scanning", Automation in Construction, vol. 49, Aug. 10, 2014, pp. 225-238.

(Continued)

*Primary Examiner* — Ming Y Hon
(74) *Attorney, Agent, or Firm* — Brinks Gilson & Lione (57) ABSTRACT

A method of processing data from a sensor, the method comprising: receiving first data; identifying an object by comparing the received first data with stored second data for a plurality of objects; determining a first processing strategy for one or more portions of the object in third data using the identification of the object, the third data being received from a sensor; and processing the determined one or more portions of the object in the third data using the determined first processing strategy.

19 Claims, 3 Drawing Sheets

(56) References Cited

U.S. PATENT DOCUMENTS

| | | | | |
|---|---|---|---|---|
| 9,886,771 | B1* | 2/2018 | Chen | G06T 7/0032 |
| 2002/0044689 | A1* | 4/2002 | Roustaei | G03F 7/705 |
| | | | | 382/199 |
| 2005/0127049 | A1* | 6/2005 | Woeste | B23K 26/04 |
| | | | | 219/121.61 |
| 2006/0069527 | A1* | 3/2006 | Numata | G06T 17/10 |
| | | | | 702/168 |
| 2007/0217672 | A1 | 9/2007 | Shannon et al. | |
| 2008/0029602 | A1* | 2/2008 | Burian | G06K 7/10722 |
| | | | | 235/462.09 |
| 2010/0039682 | A1* | 2/2010 | Peot | H04N 1/00795 |
| | | | | 358/474 |
| 2010/0044439 | A1* | 2/2010 | Lee | G06K 7/10861 |
| | | | | 235/462.08 |
| 2010/0302247 | A1* | 12/2010 | Perez | G06K 9/00201 |
| | | | | 345/440 |
| 2013/0228620 | A1* | 9/2013 | Ahern | G01C 15/002 |
| | | | | 235/439 |
| 2014/0067333 | A1* | 3/2014 | Rodney | G06T 19/00 |
| | | | | 703/1 |
| 2014/0184794 | A1 | 7/2014 | Coombs et al. | |
| 2014/0285794 | A1* | 9/2014 | Ito | G01B 11/24 |
| | | | | 356/73 |
| 2016/0012646 | A1* | 1/2016 | Huang | G06T 5/005 |
| | | | | 345/419 |
| 2016/0196687 | A1* | 7/2016 | Alpert | G06T 17/05 |
| | | | | 345/419 |
| 2017/0116631 | A1* | 4/2017 | Sarin | G06Q 30/0205 |
| 2017/0186094 | A1* | 6/2017 | Plummer | G06Q 40/00 |
| 2017/0372127 | A1* | 12/2017 | Meany | G06K 9/00214 |

OTHER PUBLICATIONS

Quan Yu, et al., "A 3D Vision-Based Quality Inspection Study for Molded Part with Multiple Geometry Shapes", Advanced Materials Research, vol. 1039, Oct. 1, 2014, pp. 529-537.

European Search Report dated Nov. 13, 2017, issued in EP Patent Application No. 17183312.2.

Khalfaoui, et. al., "Fully automatic 3D digitization of unknown objects using progressive data bounding box," Three-Dimensional Image Processing (3DIP) and Application II, Jan. 2012, San Francisco, California, US, pp. 829011, 2012.

Great Britian Search Report dated Feb. 21, 2017, issued in GB Patent Application No. 1614492.5.

* cited by examiner

METHODS, APPARATUS, COMPUTER PROGRAMS, AND NON-TRANSITORY COMPUTER READABLE STORAGE MEDIUMS FOR PROCESSING DATA FROM A SENSOR

CROSS-REFERENCE TO RELATED APPLICATIONS

This application is based upon and claims the benefit of priority from British Patent Application Number 1614492.5 filed 25 Aug. 2016, the entire contents of which are incorporated by reference.

FIELD OF THE DISCLOSURE

The present disclosure concerns methods, apparatus, computer programs, and non-transitory computer readable storage mediums for processing data from a sensor.

BACKGROUND

A sensor may be used to scan one or more surfaces of an object to generate data associated with the one or more scanned surfaces. For example, an optical sensor (such as a complementary metal oxide semiconductor (CMOS)) uses light reflected from a surface of an object to generate image data of the scanned surface. A sensor may generate a significant quantity of data during operation and this may pose a number of challenges to the operator of the sensor. In particular, a relatively large memory may be required to store the data, a relatively large internet bandwidth may be required to upload the data to remote memory (which may be referred to as cloud storage), and relatively high processing power may be required to analyse the data.

BRIEF SUMMARY

According to various examples there is provided a method of processing data from a sensor, the method comprising: receiving first data; identifying an object by comparing the received first data with stored second data for a plurality of objects; determining a first processing strategy for one or more portions of the object in third data using the identification of the object, the third data being received from a sensor; and processing the determined one or more portions of the object in the third data using the determined first processing strategy.

The method may further comprise controlling the sensor to scan the object to generate the first data.

The third data may be the same data as the first data.

The method may further comprise controlling a sensor to scan the object to generate the third data. The third data may be different data to the first data.

The first processing strategy may include processing the determined one or more portions of the object in the third data to generate fourth data.

The fourth data may be a subset of the third data and may only include data for the one or more portions of the object.

The fourth data may be in a different format to the third data.

The third data may be point cloud data and the fourth data may be geometry model mesh data.

The first processing strategy may include performing analysis to determine a parameter associated with the condition of the object.

The parameter may be remaining useful life of the object, or may be used life of the object, or may be extent of performance degradation, or may be part acceptability at new, or may be impact on noise.

Performing analysis may include performing a comparison with scanned data of the object. The scanned data may be generated prior to use of the object.

Performing analysis may include performing a comparison with geometry model data of the object.

The first data may be received from a sensor.

The received first data may include barcode data.

The received first data may include image data.

The received first data may include three dimensional geometry data.

The received first data may include radio frequency identification (RFID) code data.

The first data may be received from a user input device.

According to various examples there is provided a computer program that, when read by a computer, causes performance of the method as described in any of the preceding paragraphs.

According to various examples there is provided a non-transitory computer readable storage medium comprising computer readable instructions that, when read by a computer, cause performance of the method as described in any of the preceding paragraphs.

According to various examples there is provided apparatus for processing data from a sensor, the apparatus comprising a controller configured to: receive first data; identify an object by comparing the received first data with stored second data for a plurality of objects; determine a first processing strategy for one or more portions of the object in third data using the identification of the object, the third data being received from a sensor; and process the determined one or more portions of the object in the third data using the determined first processing strategy.

The controller may be configured to control the sensor to scan the object to generate the first data.

The third data may be the same data as the first data.

The controller may be configured to control a sensor to scan the object to generate the third data. The third data may be different data to the first data.

The first processing strategy may include processing the determined one or more portions of the object in the third data to generate fourth data.

The fourth data may be a subset of the third data and may only include data for the one or more portions of the object.

The fourth data may be in a different format to the third data.

The third data may be point cloud data and the fourth data may be geometry model mesh data.

The first processing strategy may include performing analysis to determine a parameter associated with the condition of the object.

The parameter may be remaining useful life of the object, or may be used life of the object, or may be extent of performance degradation, or may be part acceptability at new, or may be impact on noise.

Performing analysis may include performing a comparison with scanned data of the object. The scanned data may be generated prior to use of the object.

Performing analysis may include performing a comparison with geometry model data of the object.

The controller may be configured to receive the first data from a sensor.

The received first data may include barcode data.

The received first data may include image data.

The received first data may include three dimensional geometry data.

The received first data may include radio frequency identification (RFID) code data.

The controller may be configured to receive the first data from a user input device.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
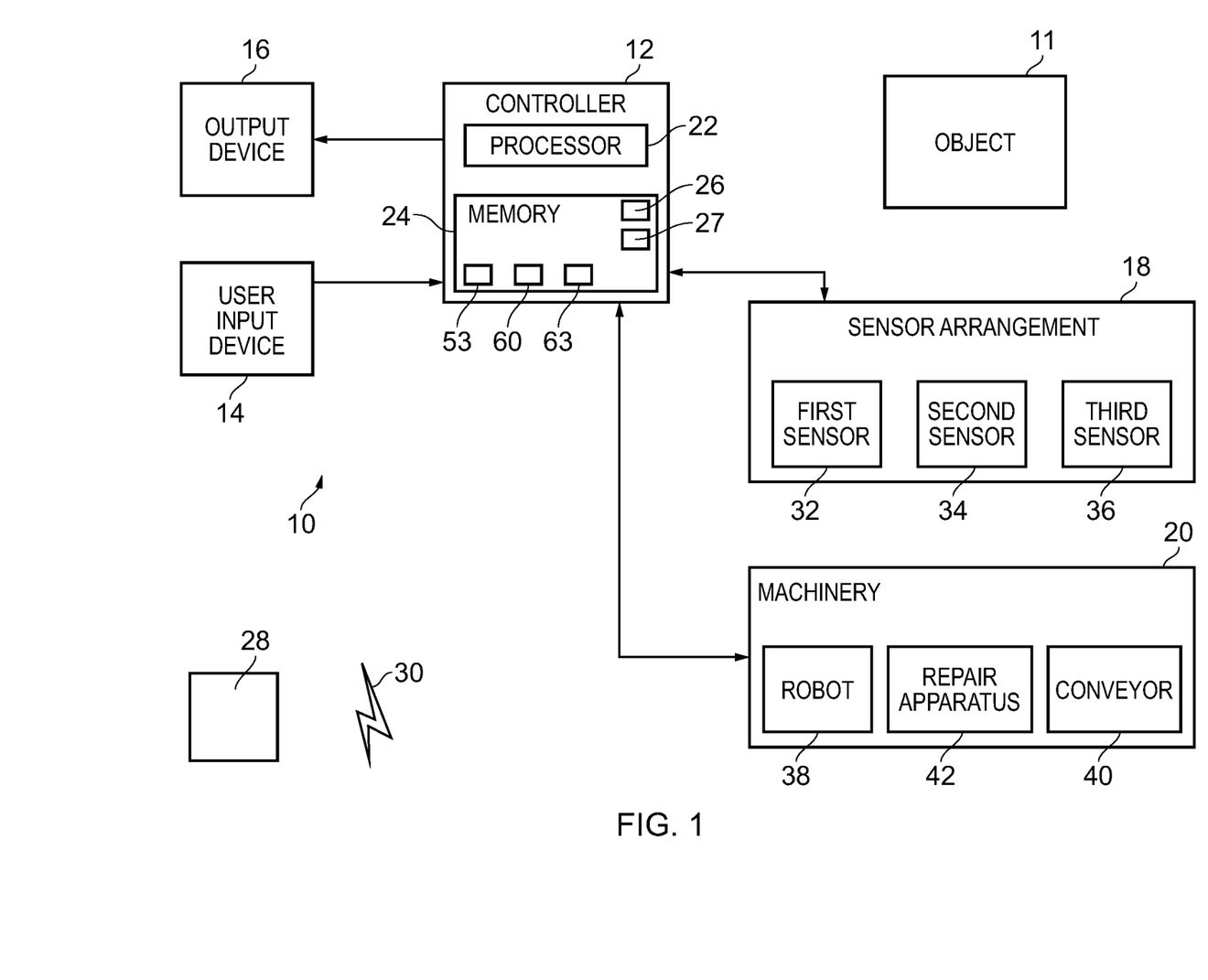
FIG. 1 illustrates a schematic diagram of apparatus according to various examples.

FIG. 1 illustrates a schematic diagram of apparatus 10 and an object 11. The apparatus 10 includes a controller 12, a user input device 14, an output device 16, a sensor arrangement 18, and machinery 20. In summary, the apparatus 10 is configured to determine the identity of the object 11 and then use the determined identity to selectively process scanned data of the object 11 from one or more sensors. The apparatus 10 may selectively process the scanned data to determine the condition of the object 11.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 12, and the remaining features (namely, the user input device 14, the output device 16, the sensor arrangement 18, and the machinery 20) may be added by another manufacturer, or by an end user.

The object 11 may be any article, component, or assembly of components. For example, the object 11 may be an aerospace component or an assembly of aerospace components. In various examples, the object 11 may be a component or an assembly of components of a gas turbine engine. For example, the object 11 may include an aerofoil (such as a compressor blade, a turbine blade, or a vane), a rotor, a disk, a bladed disk (which may be referred to as a 'blisk'), a ring, or a bladed ring (which may be referred to as a 'bling') of a gas turbine engine.

In other examples, the object 11 may be a component for another power generation industry, may be a component for the marine industry, or may be a component for the nuclear industry. For example, the object 11 may a main shaft of a diesel engine, or a valve in a nuclear power station.

In still further examples, the object 11 may include railway line, a section of road, or may be an article being inspected in a failure investigation.

The controller 12, the user input device 14, the output device 16, the sensor arrangement 18, and the machinery 20 may be coupled to one another via a wireless link and may consequently comprise transceiver circuitry and one or more antennas. Additionally or alternatively, the controller 12, the user input device 14, the output device 16, the sensor arrangement 18, and the machinery 20 may be coupled to one another via a wired link and may consequently comprise interface circuitry (such as a Universal Serial Bus (USB) socket). It should be appreciated that the controller 12, the user input device 14, the output device 16, the sensor arrangement 18, and the machinery 20 may be coupled to one another via any combination of wired and wireless links.

Figure 2:
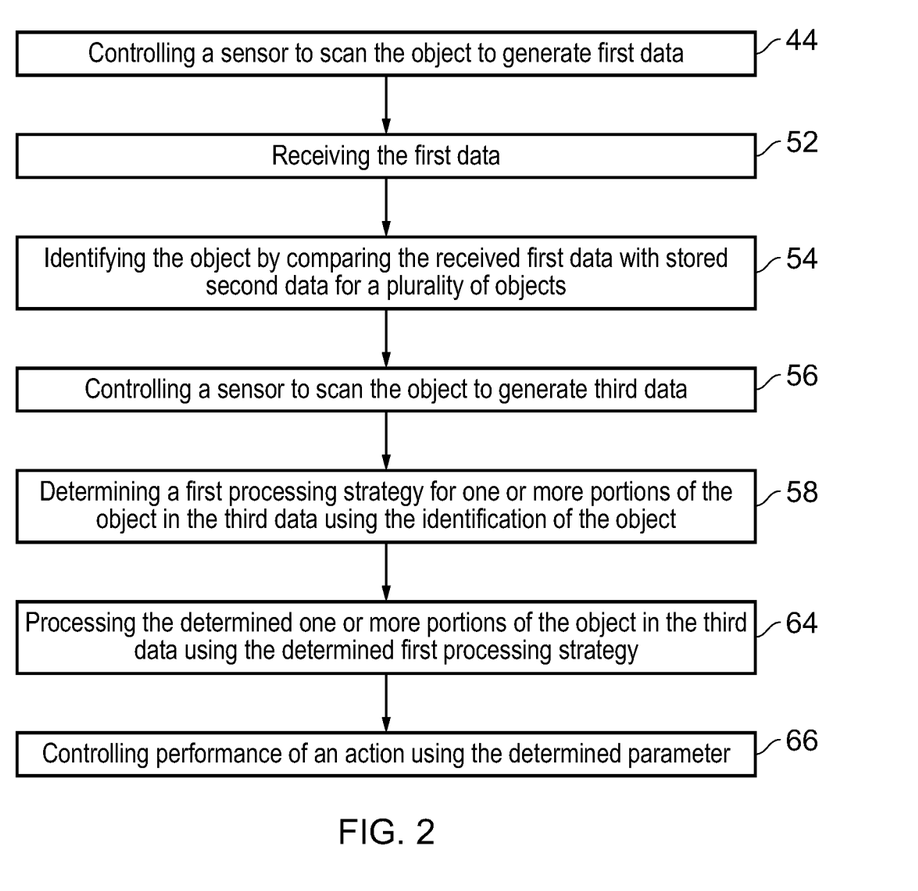
FIG. 2 illustrates a flow diagram of a method of processing data from a sensor according to various examples.

The controller 12 may comprise any suitable circuitry to cause performance of the methods described herein and as illustrated in FIG. 2. The controller 12 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 12 may comprise at least one processor 22 and at least one memory 24. The memory 24 stores a computer program 26 comprising computer readable instructions that, when read by the processor 22, cause performance of the methods described herein, and as illustrated in FIG. 2. The computer program 26 may be software or firmware, or may be a combination of software and firmware.

The memory 24 also stores data 27 for a plurality of objects. For example, the data 27 may be a database for a plurality of components of a gas turbine engine. The data 27 may include a computer aided design (CAD) geometry model for each of the plurality of objects. The data 27 may include two dimensional image data and/or three dimensional geometrical data for each of the plurality of objects that was generated by scanning the plurality of objects prior to their operation (in a gas turbine engine for example). The data 27 may include a code for each of the plurality of objects that is associated with barcodes on each of the plurality of objects or matches codes stored on radio frequency identification (RFID) electronic circuits on the plurality of objects.

The data 27 may also include information concerning the likelihood of the surfaces of each of the plurality of objects sustaining wear and/or damage during operation of the object over a period of time. The data 27 may also include information concerning the likely dimensions of the wear and/or damage features (cracks for example) of the plurality of objects. This information may be included within the data 27 during the generation of a geometry model for an object. For example, this information may be added by an operator during computer aided design of a geometry model, or may be added by an operator to a geometry model that is generated from scanned data of the object 11. Alternatively or additionally, this information may be added, or updated, after a geometry model has been generated (for example, the data 27 may be dynamically added or updated by a machine learning algorithm executed by the controller 12 in response to receiving data from the sensor arrangement 18).

The data 27 may include processing strategies for at least some of the plurality of objects and these are described in greater detail later in the detailed description.

The processor 22 may be located at the same location as the sensor arrangement 18, or may be located remote from the sensor arrangement 18, or may be distributed between the location of the sensor arrangement 18 and a location remote from the sensor arrangement 18. The processor 22 may include at least one microprocessor and may comprise a single core processor, may comprise multiple processor cores (such as a dual core processor or a quad core processor), or may comprise a plurality of processors (at least one of which may comprise multiple processor cores).

The memory 24 may be located at the same location as the sensor arrangement 18, or may be located remote from the sensor arrangement 18 (the memory 24 may comprise cloud storage for example), or may be distributed between the location of the sensor arrangement 18 and a location remote from the sensor arrangement 18. The memory 24 may be any suitable non-transitory computer readable storage medium, data storage device or devices, and may comprise a hard disk and/or solid state memory (such as flash memory). The memory 24 may be permanent non-removable memory, or may be removable memory (such as a universal serial bus (USB) flash drive or a secure digital card). The memory 24 may include: local memory employed during actual execution of the computer program; bulk storage; and cache memories which provide temporary storage of at least some computer readable or computer usable program code to reduce the number of times code may be retrieved from bulk storage during execution of the code.

The computer program 26 may be stored on a non-transitory computer readable storage medium 28. The computer program 26 may be transferred from the non-transitory computer readable storage medium 26 to the memory 24. The non-transitory computer readable storage medium 28 may be, for example, a USB flash drive, a secure digital (SD) card, an optical disc (such as a compact disc (CD), a digital versatile disc (DVD) or a Blu-ray disc). In some examples, the computer program 26 may be transferred to the memory 24 via a signal 30 (such as a wireless signal or a wired signal). The computer program 26 may be received from cloud storage which may advantageously enable the computer program 26 to be updated relatively quickly.

Input/output devices may be coupled to the apparatus 10 either directly or through intervening input/output controllers. Various communication adaptors may also be coupled to the controller 12 to enable the apparatus 10 to become coupled to other apparatus or remote printers or storage devices through intervening private or public networks. Non-limiting examples include modems and network adaptors of such communication adaptors.

The user input device 14 may comprise any suitable device for enabling an operator to at least partially control the apparatus 10. For example, the user input device 14 may comprise one or more of a keyboard, a keypad, a touchpad, a touchscreen display, a computer mouse, and an augmented reality input device. The controller 12 is configured to receive signals from the user input device 14.

The output device 16 may be any suitable device for conveying information to an operator. For example, the output device 16 may include a display (such as a liquid crystal display (LCD), or a light emitting diode (LED) display, or an active matrix organic light emitting diode (AMOLED) display, or a thin film transistor (TFT) display, or a cathode ray tube (CRT) display), and/or a loudspeaker, and/or a printer (such as an inkjet printer or a laser printer). The controller 12 is arranged to provide a signal to the output device 16 to cause the output device 16 to convey information to the operator.

The sensor arrangement 18 may include one or more sensors for scanning the object 11. For example, the one or more sensors may include one or more co-ordinate measuring machines (CMM) (such as a contact co-ordinate measuring machine or a non-contact measuring machine), one or more optical sensors (such as one or more charge coupled device (CCD) cameras or one or more complementary metal oxide semiconductor (CMOS) cameras), one or more infrared sensors, one or more X-ray sensors, one or more acoustic wave sensors (such as one or more ultrasonic transducers), or radio frequency circuitry (such as a radio frequency identification (RFID) electronic circuits). The one or more sensors may additionally include one or more emitters such as structured light emitters, lasers, X-ray sources, and acoustic wave emitters (such as ultrasonic transducers), and/or a receiver or transceiver of radio frequency electromagnetic waves.

In the example illustrated in FIG. 1, the sensor arrangement 18 includes a first sensor 32, a second sensor 34, and a third sensor 36. In various examples, the first sensor 32 includes a digital camera (comprising a complementary metal oxide semiconductor sensor or a charge coupled device sensor for example), the second sensor 34 includes one or more lasers and an optical sensor, and the third sensor 36 includes an acoustic wave transducer (such as an ultrasonic transducer).

The controller 12 is configured to control the operation of the sensor arrangement 18. For example, the controller 12 may control a structured light emitter of the sensor arrangement 18 to emit structured light for stereophotogrammetry. In some examples, the sensor arrangement 18 may include one or more actuators (such as one or more servomotors) and the controller 12 may control the one or more actuators to control the position and/or orientation of the sensor arrangement 18.

The controller 12 is also configured to receive data from the sensor arrangement 18. For example, the controller 12 may receive two dimensional image data (which may comprise individual images or video images), and/or three dimensional point cloud data, polygon mesh data, triangle mesh data, non-uniform rational B-spline (NURBS) surface model data, and/or data from an acoustic wave transducer (such as an ultrasonic transducer), and/or code data from a receiver of radio frequency electromagnetic waves (such radio frequency identification code data).

The machinery 20 may include any suitable machinery for performing an action on the object 11. For example, the machinery 20 may include any suitable machinery for moving the object 11, and/or changing the orientation of the object 11, and/or removing material from the object 11, and/or adding material to the object 11, and/or the addition and removal of a coating to better image the object 11 (for example, a fine white matt finish powder coating to avoid reflective surfaces). The controller 12 is configured to control the operation of the machinery 20 to perform the action on the object 11.

In the example illustrated in FIG. 1, the machinery 20 includes a robot 38, a conveyor 40, and repair apparatus 42. The robot 38 may be a 'pick and place' robot (such as a robotic arm) that is configured to move the object 11 over relatively short distances (up to one or two meters for example) and/or to change the orientation of the object 11. The conveyor 40 is configured to move the object 11 over relatively long distances (around a repair facility or around a manufacturing site for example). The repair apparatus 42 may include any apparatus for removing material from the object 11 and/or any apparatus for adding material to the object 11. For example, the repair apparatus 42 may include one or more machine tools (such as a blending tool, a grinding tool, a drill), and/or welding apparatus, and/or chemical vapour deposition (CVD) apparatus.

The operation of the apparatus 10 is described in the following paragraphs with reference to FIGS. 1 to 4.

Initially, the method may include controlling movement of the object 11 towards the sensor arrangement 18. For example, the controller 12 may control the robot 38 and/or the conveyor 40 to move the object 11 towards the sensor arrangement 18 to enable the sensor arrangement 18 to scan the object 11.

At block 44, the method may include controlling a sensor to scan at least a part of the object 11 to generate first data. For example, the controller 12 may control the first sensor 32 of the sensor arrangement 18 to scan at least a part of the object 11 to generate two dimensional image data of the object 11.

Figure 3:
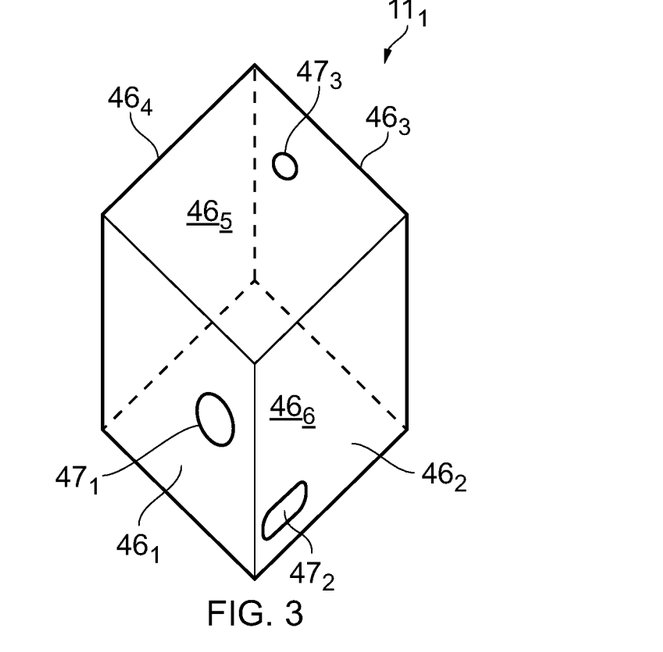
FIG. 3 illustrates a perspective view of an object according to various examples.

FIG. 3 illustrates a perspective view of an object $11_1$. The object $11_1$ is a cube having a first face $46_1$, a second face $46_2$, a third face $46_3$, a fourth face $46_4$, a fifth face $46_5$, and a sixth face $46_6$. The first face $46_1$ includes a first feature $47_1$, the second face $46_2$ includes a second feature $47_2$, and the fifth face $46_5$ includes a third feature $47_3$. The first feature $47_1$, the second feature $47_2$ and the third feature $47_3$ may be any physical features of the object $11_1$ and may be, for example, protrusions, recesses, flanges, apertures.

At block 44, the controller 12 may control the sensor arrangement 18 to scan the first face $46_1$, the second face $46_2$ and the fifth face $46_5$.

Figure 4:
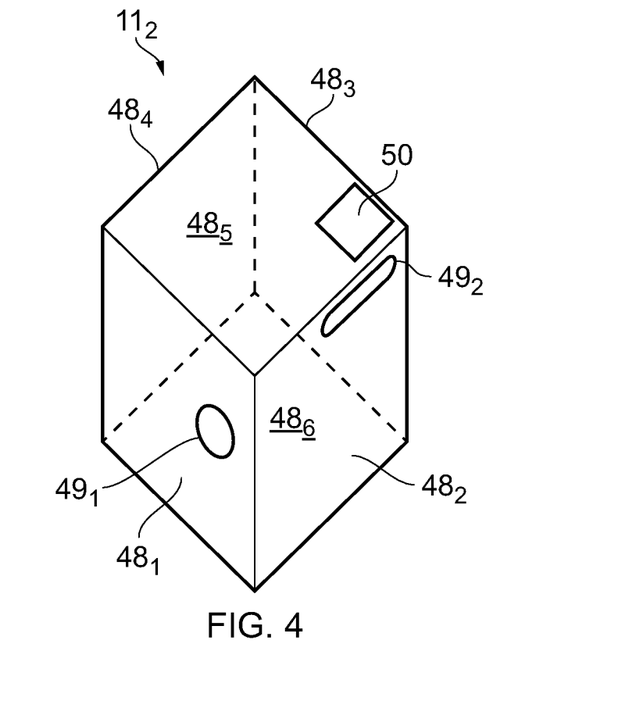
FIG. 4 illustrates a perspective view of another object according to various examples.

FIG. 4 illustrates a perspective view of another object $11_2$. The object $11_2$ is a cube having a first face $48_1$, a second face $48_2$, a third face $48_3$, a fourth face $48_4$, a fifth face $48_5$, and a sixth face $48_6$. The first face $48_1$ includes a first feature $49_1$ and the second face $48_2$ includes a second feature $49_2$. The first feature $49_1$ and the second feature $49_2$ may be any physical features of the object $11_1$ and may be, for example, protrusions, recesses, flanges, apertures.

The fifth face $48_5$ includes a barcode 50 that occupies a subset of the area of the fifth face $48_5$. The barcode 50 may be a one dimensional barcode (which may also be referred to as a linear barcode), or may be a two dimensional barcode (which may also be referred to as a matrix barcode and examples include QR codes). At block 44, the controller 12 may control the sensor arrangement 18 to scan the barcode 50 on the fifth surface $48_5$.

In other examples, the fifth face $48_5$ may include a radio frequency identification (RFID) electronic circuit 50 and the sensor arrangement 18 may include a corresponding radio frequency identification (RFID) electronic circuit. At block 44, the controller 12 may control the radio frequency identification device of the sensor arrangement 18 to scan the radio frequency identification device on the object 11.

At block 52, the method includes receiving first data. The first data may be received from the sensor arrangement 18. For example, the controller 12 may receive first data 53 from any one or more of the first sensor 32, the second sensor 34 and the third sensor 36 of the sensor arrangement 18. In some examples, the first data may be additionally or alternatively received from the user input device 14. For example, an operator may use the user input device to enter a known part number for the object 11. The controller 12 may store the received first data 53 in the memory 24.

At block 54, the method includes identifying the object 11 by comparing the received first data with stored data for a plurality of objects. For example, the controller 12 may identify the object 11 by comparing the first data received at block 52 with the data 27 stored in the memory 24 (which may also be referred to as second data 27).

For example, where the controller 12 receives two dimensional image data of the object $11_1$ from the sensor arrangement 18, the controller 12 may identify the object $11_1$ by using an image recognition algorithm on the received first data and the two dimensional images within the stored second data 27. The image recognition algorithm may use the position and dimensions of the first, second, and third features $47_1$, $47_2$, $47_3$ to assist with the identification of the object $11_1$ when comparing the received first data 53 and the stored second data 27. Where the controller 12 determines that the received two dimensional image data matches an image in the stored second data 27, the controller 12 identifies the object $11_1$ as being the object associated with the matched image in the stored second data 27.

Where the controller 12 receives three dimensional data (such as point cloud data or polygon mesh data) of the object $11_1$ from the sensor arrangement 18, the controller 12 may identify the object $11_1$ by comparing the received three dimensional data with the three dimensional geometry models in the stored second data 27. In particular, the controller 12 may compare the geometry of the object $11_1$ and the positions of the first, second and third features $47_1$, $47_2$, $47_3$ in the received first data with the geometry and features in the geometry models in the stored second data 27 to identify the object $11_1$. Where the controller 12 determines that the received three dimensional data matches three dimensional data within the stored second data 27 (within acceptance limits), the controller 12 identifies the object $11_1$ as being the object associated with the matched geometry model in the stored second data 27.

Where the controller 12 receives a code (such as a barcode or an RFID code) in the received first data from the sensor arrangement 18, the controller 12 may identify the object $11_2$ by comparing the received code with the codes within the stored second data 27. Where the controller 12 determines that the received code matches a code within the stored second data 27, the controller 12 identifies the object $11_2$ as being the object associated with the matched code in the stored second data 27.

It should be appreciated that the method may include identifying the object using multiple different forms of first data. For example, where the controller 12 determines that a barcode is not fully legible and is not able to definitively identify an object, the controller 12 may additionally control the sensor arrangement 18 to scan key features of the object to identify the object.

At block 56, the method may include controlling one or more sensors to scan the object 11 to generate third data. For example, the controller 12 may control the sensor arrangement 18 to scan part of the object 11 or the whole of the object 11 to generate third data. The controller 12 may also receive the generated third data from the sensor arrangement 18 and may store the third data in the memory 24.

In other examples, the method may not include block 56 and the third data referred to in the following paragraphs is the same data as the first data received at block 52.

At block 58, the method includes determining a first processing strategy for one or more portions of the object 11 using the identification of the object. The one or more portions may be any subset of the identified object 11. For example, the one or more portions may include a plurality of surfaces of the object (for example, the first, second and fifth faces $46_1$, $46_2$, $46_5$ of the object $11_1$), or the one or more portions may be only a single surface of an object (for example, the first face $46_1$ of the object $11_1$), or the one or more portions may be only one or more subsets of one or more surfaces of an object (for example, the first feature $47_1$ of the first face $46_1$, and/or the second feature $47_2$ of the second face $46_2$, and/or the third feature $47_3$ of the fifth face $46_5$).

The controller 12 may use the identification of an object from block 54 to read a processing strategy for that object from the memory 24. The processing strategies may be stored as part of the stored second data 27, or may be stored in a separate database that associates each of the plurality of objects with a processing strategy.

Alternatively, the controller 12 may use the identification of an object to generate a processing strategy using data stored in the memory 24. For example, the controller 12 may use the data for the likelihood of the surfaces of an object sustaining wear and/or damage during operation in the stored second data 27 to generate the processing strategy. Where the controller 12 determines that a surface has a greater likelihood of sustaining wear, the controller 12 may generate a processing strategy that results in only that surface being analysed. By way of another example, where the identified object does not have an associated processing strategy, the controller 12 may compare the identified object with the plurality of objects in the second data 27. Where the identified object is similar to one of the objects in the second data 27, the controller 12 may use the processing strategy of the similar object for use with the identified object.

A processing strategy for an object may direct that the object be analysed in a non-uniform manner by the controller 12. Such a processing strategy typically results in analysis being performed for areas of interest on the object (for example, areas that are likely to have sustained damage or wear during operation) and not for areas of lower interest (for example, areas that are less likely to have sustained damage or wear during operation).

The first processing strategy may include processing the one or more portions of the object 11 in the third data to generate fourth data 60. The fourth data 60 may be a subset of the third data and may only include data for the one or more portions of the object 11. The fourth data 60 may be in a different format to the third data. For example, where the third data is three dimensional point cloud data for the whole of the object $11_1$, the controller 12 may only convert the point cloud data for the first face $46_1$ into geometry model mesh data 60.

The first processing strategy may include processing third data from two or more different sensors 18. For example, the first processing strategy may include processing coloured two dimensional image data and three dimensional data. The two or more different types of data may enable the controller 12 to more accurately identify the features of an object 11 and to determine the dimensions of such features. For example, the coloured two dimensional image data may be used by the controller 12 to identify the location of a crack in an object (since the crack may be darker than the surrounding surface) and the three dimensional data may be used by the controller 12 to identify the dimensions of the crack.

The first processing strategy may include targeting areas of the object 11 within the third data that were previously identified in an earlier scan of the same object, for example, to build a degradation parameter with time for the object 11.

The first processing strategy includes performing analysis to determine one or more parameters 63 associated with the condition of the object 11. In some examples, the controller 12 may perform analysis on only the fourth data 60 to determine one or more parameters 63 associated with the condition of the object 11. For example, where the fourth data 60 is geometry model mesh data 60 of the first face $46_1$, the controller 12 may only analyse the features of the first face $46_1$ (such as the first feature $47_1$) to determine one or more parameters 63 associated with the condition of the object 11. The one or more parameters 63 associated with the condition of the object 11 may be remaining useful life of the object 11, used life of the object 11, extent of performance degradation, part acceptability at new, and impact on noise.

In other examples, the controller 12 may perform analysis on only the subset of the third data that corresponds to the one or more portions of the object 11 to determine a parameter 63 associated with the condition of the object 11. For example, where the third data is three dimensional mesh data for the whole of the object $11_1$, the controller 12 may only analyse the first feature $47_1$ in the three dimensional mesh data to determine the parameter 63.

At block 64, the method includes processing the determined one or more portions of the object 11 using the determined first processing strategy. For example, the controller 12 may use the determined first processing strategy to generate fourth data 60 from the third data, and the controller 12 may then analyse the fourth data 60 to determine one or more parameters, such as the remaining useful life of the object 11, and/or the used life of the object 11, and/or extent of performance degradation, and/or part acceptability at new, and/or impact on noise.

In some examples, an object 11 may be scanned prior to use (immediately after manufacture of the object 11 for example) and the scanned data (which may be a two dimensional image data, or three dimensional geometry data) may be stored in the memory 24. The controller 12 may compare the third data and/or the fourth data 60 with the scanned data of the object 11 to determine one or more parameters 63 associated with the condition of the object 11.

In other examples, the controller 12 may compare the third data and/or the fourth data 60 with the second data 27 stored in the memory 24 to determine one or more parameters 63 associated with the condition of the object 11. For example, the controller 12 may compare the third data and/or the fourth data 60 with a geometry model of the object 11 in the second data 27 stored in the memory 24.

At block 66, the method may include controlling performance of an action using the determined one or more parameters 63. For example, the controller 12 may determine that the condition of the object 11 is below a first threshold (indicating that the object 11 is not repairable), and may then control the conveyor 40 to move the object 11 to a scrap/recycling heap. By way of another example, the controller 12 may determine that the condition of the object 11 is above the first threshold, but below a second threshold (indicating that the object 11 is not suitable for use, but is repairable), and may then control the conveyor 40 to move the object 11 to the repair apparatus 42. Once the object 11 arrives at the repair apparatus 42, the controller 12 may control the repair apparatus 42 to repair the object 11.

The controller 12 may rank the object 11 acceptability for re-use/repair/scrap using a range of parameters including life, performance degradation, impact on noise, and so on. Furthermore, the algorithm executed by the controller 12 may not be a simple criteria of satisfying a threshold of part condition or even a fixed forward life but one that can adjust based on a current condition based on existing life and a forward life need (for example, two thousand hours more duty would have a different acceptance to four thousand hours more duty). The operator may use the user input device 14 to adjust the thresholds for the actions.

The method may then return to block 44 for the same object, or may return to block 44 for a new object. Alternatively, the method may end.

The apparatus 10 and the methods described above may be advantageous in that the controller 12 may selectively process data from the sensor arrangement 18 using knowledge of the identity of the object 11. The selective processing of the data may result in block 64 being performed more quickly since only a subset of the scanned data is analysed. This may enable a higher rate of objects 11 to be processed according to the method illustrated in FIG. 2. Alternatively, the selective processing of the data may enable reduced computing power to be used when compared to a method were selective processing is not used. The apparatus 10 and the methods described above may also be advantageous in that they may enable objects to be automatically inspected and repaired with little or no human intervention.

The apparatus 10 and the methods described above may also be advantageous in that data may be stored to build a statistical understanding of one or more parameters of the object 11. This may enable the computer program 26 to be adjusted over time to be more optimal (thus, the methodology may be an evolving approach to object 11 sentencing).

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

The invention claimed is:

1. A method of processing data from a sensor, the method comprising:
   receiving first data;
   identifying an object by comparing the received first data with stored second data for a plurality of objects;
   determining a first processing strategy for one or more portions of the object in third data using the identification of the object, the third data being received from a sensor, the first processing strategy comprising performing an analysis to determine a parameter associated with a condition of the object, wherein determining the first processing strategy includes determining the one or more portions of the object based on a likelihood of surfaces of the one or more portions of the object sustaining wear, damage, or both relative to surfaces of other portions of the object;
   processing the determined one or more portions of the object in the third data using the determined first processing strategy by analyzing the one or more portions of the object in the third data to determine the parameter associated with the condition of the object; and
   determining whether the condition of the object is below a threshold indicating that the object is not repairable.

2. A method as claimed in claim 1, further comprising controlling the sensor to scan the object to generate the first data.

3. A method as claimed in claim 1, wherein the third data is the same data as the first data.

4. A method as claimed in claim 1, further comprising controlling a sensor to scan the object to generate the third data, the third data being different data to the first data.

5. A method as claimed in claim 1, wherein the first processing strategy includes processing the determined one or more portions of the object in the third data to generate fourth data.

6. A method as claimed in claim 5, wherein the fourth data is a subset of the third data and only includes data for the one or more portions of the object.

7. A method as claimed in claim 5, wherein the third data is point cloud data and the fourth data is geometry model mesh data.

8. A method as claimed in claim 1, wherein the parameter is remaining useful life of the object, or wherein the parameter is used life of the object or wherein the parameter is extent of performance degradation, or wherein the parameter is part acceptability at new, or wherein the parameter is impact on noise.

9. A method as claimed in claim 1, wherein performing analysis includes performing a comparison with scanned data of the object, the scanned data being generated prior to use of the object.

10. A method as claimed in claim 1, wherein performing analysis includes performing a comparison with geometry model data of the object.

11. A method as claimed in claim 1, wherein the first data is received from a sensor.

12. A method as claimed in claim 1, wherein the received first data includes barcode data, or wherein the received first data includes image data, or wherein the received first data includes three dimensional geometry data, or wherein the received first data includes radio frequency identification (RFID) code data.

13. A method as claimed in claim 1, wherein the first data is received from a user input device.

14. A non-transitory computer readable storage medium comprising computer readable instructions that, when read by a computer, cause performance of the method as claimed in claim 1.

15. A method as claimed in claim 1 further comprising controlling a conveyor to move the object to a scrap/recycling heap in response to a determination that the condition of the object is below the threshold indicating that the object is not repairable.

16. A method as claimed in claim 1 further comprising building a statistical understanding of one or more parameters of the object.

17. Apparatus for processing data from a sensor, the apparatus comprising a controller configured to:
   receive first data;
   identify an object by comparing the received first data with stored second data for a plurality of objects;
   determine a first processing strategy for one or more portions of the object in third data using the identification of the object, the third data being received from a sensor, the first processing strategy comprising performing an analysis to determine a parameter associated with a condition of the object, wherein the controller is configured to determine the one or more portions of the object based on a likelihood of surfaces of the one or more portions of the object sustaining wear, damage, or both being greater than other portions of the object;

process the determined one or more portions of the object in the third data using the determined first processing strategy via an analysis of the one or more portions of the object in the third data to determine the parameter associated with the condition of the object; and determine whether the object is repairable based on the parameter associated with the condition of the object.

18. Apparatus as claimed in claim 17, wherein the first processing strategy includes processing the determined one or more portions of the object in the third data to generate fourth data.

19. Apparatus as claimed in claim 17, wherein performing analysis includes performing a comparison with scanned data of the object, the scanned data being generated prior to use of the object, or wherein performing analysis includes performing a comparison with geometry model data of the object.

* * * * *